(12) United States Patent
El-essawy et al.

(10) Patent No.: US 8,285,973 B2
(45) Date of Patent: Oct. 9, 2012

(54) THREAD COMPLETION RATE CONTROLLED SCHEDULING

(75) Inventors: Wael R. El-essawy, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 687 days.

(21) Appl. No.: 12/185,206

(22) Filed: Aug. 4, 2008

(65) Prior Publication Data
US 2010/0031006 A1 Feb. 4, 2010

(51) Int. Cl.
*G06F 9/30* (2006.01)
(52) U.S. Cl. ....................................................... 712/205
(58) Field of Classification Search .................. None
See application file for complete search history.

(56) References Cited

U.S. PATENT DOCUMENTS

| | | | |
|---|---|---|---|
| 6,549,930 B1 | 4/2003 | Chrysos et al. | |
| 6,658,447 B2 | 12/2003 | Cota-Robles | |
| 6,658,654 B1 * | 12/2003 | Berry et al. | 717/131 |
| 6,697,935 B1 | 2/2004 | Borkhagen et al. | |
| 7,237,093 B1 | 6/2007 | Musoll et al. | |
| 7,269,712 B2 | 9/2007 | Cho | |
| 7,454,600 B2 * | 11/2008 | Burns et al. | 712/219 |
| 2004/0216103 A1 * | 10/2004 | Burky et al. | 718/100 |
| 2004/0216113 A1 | 10/2004 | Armstrong et al. | |
| 2009/0113180 A1 * | 4/2009 | Banerjee et al. | 712/205 |

OTHER PUBLICATIONS

El-Moursy, et al., "Front-End Policies for Improved Issue Efficiency in SMT Processors", Proceedings of the 9th Intl. Conference on High Performance Computer Architecture, 2003, Anaheim, CA.

Luo, et al., "Boosting SMT Performance by Speculation Control", 15th International Parallel and Distributed Processing Symposium, 2001, San Francisco, CA.

Malik, et al., "PaCo: Probability-based Path Confidence Prediction", Proceedings of the 14th Intl. Conference on High Performance Computer Architecture, Feb. 2008, Salt Lake City, UT.

Tullsen, et al., "Handling Long-Latency Loads in a Simultaneous Multithreading Processor", Proceedings of the $34^{th}$ Intl. Symposium on Microarchitecture, Dec. 2001, Austin, TX.

Tullsen, et al., "Exploiting Choice: Instruction Fetch and Issue on an Implementable Simultaneous Multithreading Processor", $23^{rd}$. Intl. Symposium on Computer Architecture, 1996, Philadelphia, PA.

Yoaz, et al., "Speculation Techniques for Improving Load Related Instruction Scheduling", $26^{th}$ Intl. Symposium on Computer Architecture, 1999, Los Alamitos, CA.

\* cited by examiner

*Primary Examiner* — Jacob A Petranek
(74) *Attorney, Agent, or Firm* — Mitch Harris Atty at Law, LLC; Andrew M. Harris; Libby Z. Toub

(57) ABSTRACT

A method, processor and processing system provide management of per-thread pipeline resource allocation in a simultaneous multi-threaded (SMT) processor by counting indications of instruction completion for each of the threads. The indication may be the commit phase of the pipeline, which indicates results of the pipeline instruction execution are ready for write-back. The completion counts are used in a relative or absolute form to control the pipeline resource allocation. The decode or fetch rates of instructions for the threads can be controlled from the relative or absolute completion counts, providing control of scheduling instructions among the threads for execution by execution pipeline(s). Alternatively, or in combination, the thread priority registers in any thread priority management scheme can be controlled by comparison and/or scaling of the completion counts.

20 Claims, 4 Drawing Sheets

THREAD COMPLETION RATE CONTROLLED SCHEDULING

BACKGROUND OF THE INVENTION

1. Field of the Invention

The present invention is related to processing systems and processors, and more specifically to techniques for controlling resources allocated to hardware threads by measuring rates of instruction completion for multiple threads.

2. Description of Related Art

Allocation of resources to hardware threads executing within a simultaneous multi-threaded (SMT) processor has been controlled by a variety of techniques. Typically, various priority values are set by either properties of the programs to which threads belong and the functions of the threads, in order to allocate more resources to high-priority threads and less resources to lower-priority threads. Also typically, the mechanism for controlling the resources allocated to a thread is implemented by controlling the relative instruction fetch rate for the threads. More recently, control of the instruction decode rate for each thread has been used to control relative thread priority.

The input to thread priority control schemes has been determined from various metrics that indicate whether or not a thread will execute efficiently. For example, a thread that is generated a large number of cache misses or translation lookaside buffer (TLB) misses may be throttled to improve performance, e.g., by reducing the fetch rate or decode rate for that thread. Other techniques measure the average memory latency for a thread, or the number of branches present in a thread, as the number of branches is a predictor of how many stalls or speculative instructions may be encountered in execution of a thread, which is a predictor of thread performance. Further, in processors supporting speculative execution of instructions, the speculatively executed instructions are sometimes executed at a lower priority in order to reduce the impact of mis-speculation on performance.

However many of the above techniques require multiple metrics to control thread priority may measure irrelevant events, such as cache misses in non-taken branch paths, and in some cases the events on which thread priority control is based can be difficult to measure.

Therefore, it would be desirable to provide thread scheduling control from single metric that is easy to measure and that has a strong relationship to actual thread performance.

BRIEF SUMMARY OF THE INVENTION

The invention is embodied in a method, processor and system in which thread scheduling is controlled in conformity with a measure completion rate of instructions in the pipeline(s).

Pipeline Resources allocated to multiple threads are controlled according to completion rates of instructions in processing pipelines. The completion rates for each of the multiple threads is measured, e.g., by detecting the commit phase of the instructions which signals write-back of instruction processing results to physical registers, and counting the number of commit phases encountered for each of the multiple threads. The completion rates are used to adjust a thread priority/scheduling scheme that controls the instruction decode rate, instruction fetch rate and/or another controllable constraint that permits the system to manage the resources allocated among the multiple threads. Either relative completion rates or the absolute completion counts can be used as the input to the thread resource allocation scheme.

The above-described control methodology can be used to control pipeline resource allocation according to a fairness scheme, i.e., the threads each receive an amount of pipeline resource that is either equal or rationed according to a thread priority scheme, or the methodology can control pipeline resource allocation to favor threads that are generating higher completion rates in order to improve processor throughput and thereby favor processing efficiency.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to simultaneous multi-threaded (SMT) processors and processing systems in which allocation of pipeline resources is controlled according to a completion rate of instructions in the pipeline(s) for multiple threads. An indicator of completion of instructions, which may be a measurement of the occurrence of commit phase indications for each thread, is used to control the amount of pipeline resources allocated among the multiple threads, for example by controlling the instruction fetch and/or decode rate for each thread. The control scheme can be used to enforce a fairness scheme that allocates resources equally, according to a thread priority schedule, or the control scheme can favor threads that have a high completion rate in order to promote efficient use of processing resources. For example, threads with many stall events can clog the pipelines, reducing processor throughput. By increasing the pipeline resources allocated to other threads, processor throughput can be improved without requiring pipeline flushing or other techniques used to reduce the number of outstanding instructions from the stalled threads.

Figure 1:
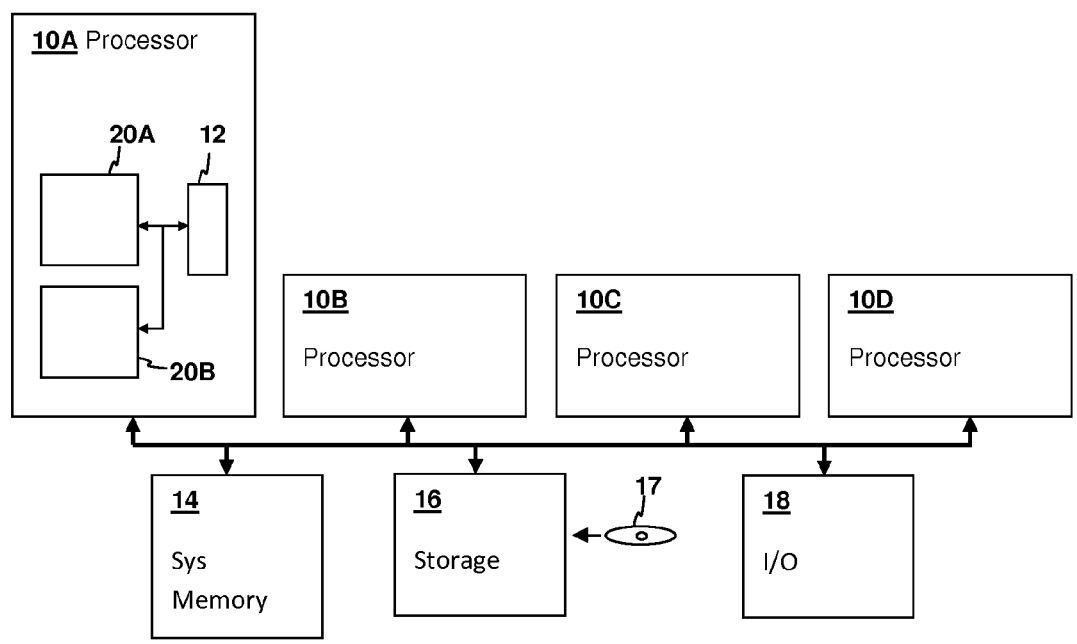
FIG. 1 is a block diagram illustrating a processing system in which techniques according to an embodiment of the present invention are practiced.

Referring now to FIG. 1, a processing system in accordance with an embodiment of the present invention is shown. The depicted processing system includes a number of SMT processors 10A-10D, each in conformity with an embodiment of the present invention. The depicted multi-processing system is illustrative, and processing system in accordance with other embodiments of the present invention include uni-processor systems. Processors 10A-10D are identical in structure and include cores 20A-20B and local storage 12, which may be a cache level, or a level of internal system memory. Processors 10A-10D are coupled to main system memory 14, a storage subsystem 16, which includes non-removable drives and optical drives, for reading media such as a CD-ROM 17 for loading program code for execution by processors 10A-10D. The illustrated processing system also includes input/output (I/O) interfaces and devices 18 such as mice and keyboards for receiving user input and graphical displays for displaying information. While the system of FIG. 1 is used to provide an illustration of a system in which the completion-driven thread priority/resource allocation methodology of the present invention is implemented, it is understood that techniques of the present invention can be implemented in other architectures and that the present invention applies to other SMT processors in accordance with embodiments of the present invention that may be used in a variety of system architectures.

Figure 2:
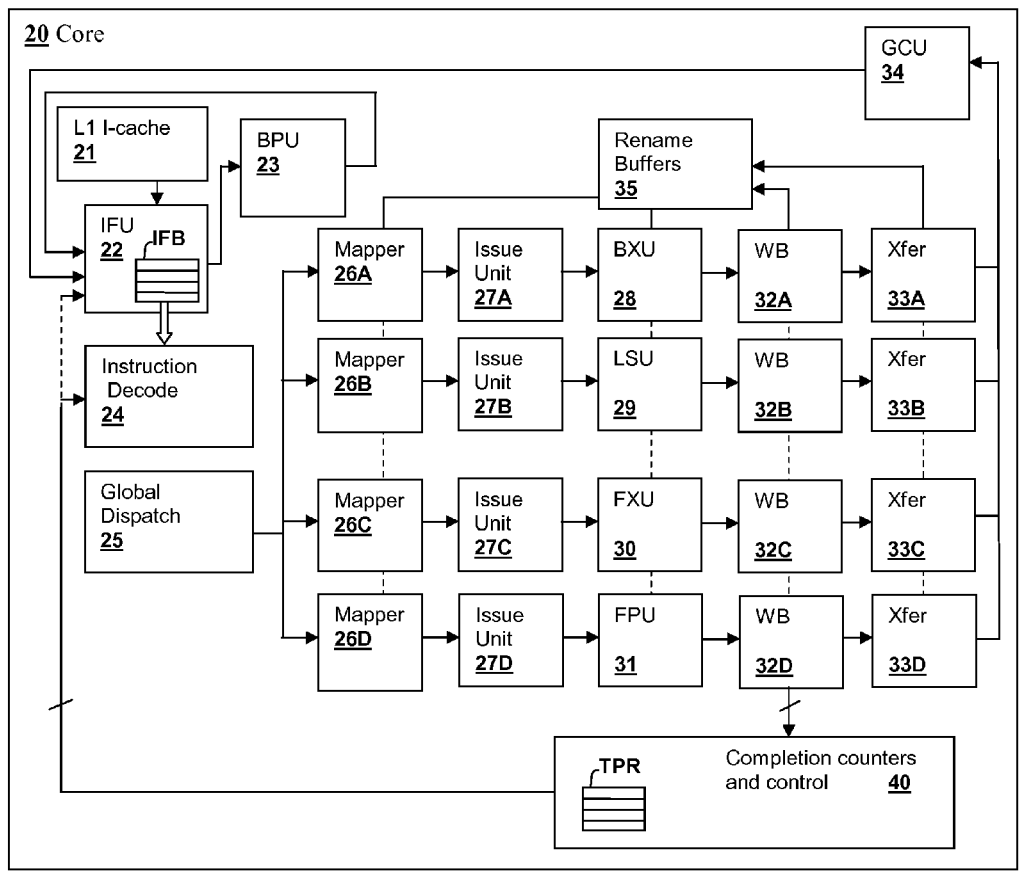
FIG. 2 is a block diagram illustrating details of processor core 20 of FIG. 1.

Referring now to FIG. 2, details of processor cores 20A-20B of FIG. 1 are illustrated in depicted core 20. Core 20 includes an instruction fetch unit (IFU) 22 that fetches instruction streams from cache or system memory. IFU 22 includes a set of instruction fetch buffers IFB including a separate buffer for each thread. Instructions fetched by IFU 22 are placed in instruction fetch buffers IFB, which provides instructions to an instruction decode unit 24. By controlling the rate of transfer of instructions from an L1 I-cache 21 to instruction fetch buffers IFB for each individual thread, the rate of fetch for the threads can be controlled in response to signals from completion counters and control 40. An instruction decode unit 24 decodes instructions stored in instruction fetch buffers IF, which are provided to instruction decode unit 24. By controlling the rate of transfer of instructions from instruction fetch buffers IFB to instruction decode unit 24 according to signals provided from completion counters and control 40, the decode rate for each thread can be controlled. According to different embodiments of the present invention, either IFU 22, decode unit 24, or both may be present to control the instruction fetch rate and/or instruction decode rate for each thread.

A global dispatch unit 25 dispatches the decoded instructions to a number of internal processor pipelines. The processor pipelines each include a mapper 26A-26D, an issue unit 27A-27D, an execution unit, one of branch execution unit (BXU) 28, load/store unit (LSU) 29, fixed-point unit (FXU) 30 or floating point unit (FPU) 31, a write back unit (WB) 32A-32D and a transfer unit (Xfer) 33A-33D. A global completion unit (GCU) 34 provides an indication when result transfer is complete to IFU 22. Mappers 26A-26D allocate rename buffers 35 to represent registers or "virtual registers" indicated by instructions decoded by instruction decode unit 24 so that concurrent execution of program code can be supported by the various pipelines. Out-of-order execution is also supported by the use of rename buffers 35 as the register values are fully virtualized by the action of mappers 26A-26D. WBs 32A-32D write pipeline results back to associated rename buffers 35 and Xfers 33A-33D provide an indication that write-back is complete to GCU 34 so that pipeline results are synchronized with the execution and instruction fetch process.

In the illustrated core 20, "commit" signals from WBs 32A-32D, in addition to being provided to rename buffers 35, are also provided to completion counters and control 40, which accumulates completions from each pipeline in per-thread counters according to the thread(s) corresponding to the completions occurring in each cycle. Counting commit occurrences at the end of each cycle provides a better indication of processor throughput than counting front-end events such as instruction dispatch. Completion counters and control 40 uses the relative or absolute per-thread instruction completion counts to control the rate of instruction fetch and/or instruction decode for each thread as described above, which may alternatively be effected by adjusting a thread priority register TPR for each thread that controls the instruction fetch rate and/or instruction decode rate, or alternatively controls other throughput-governing factors such as the instruction dispatch rate from global dispatch 25, on a per-thread basis.

Figure 3:
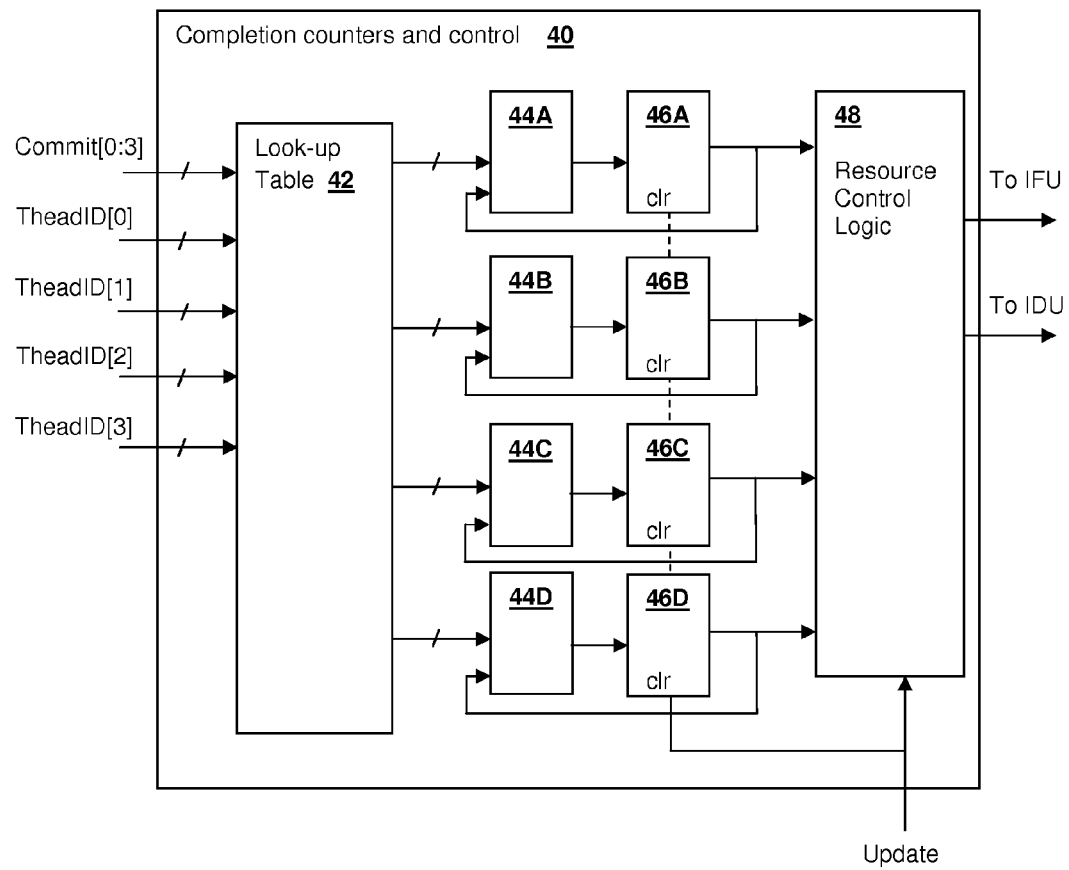
FIG. 3 is a block diagram illustrating details of completion counters and control circuit 40 of FIG. 2.

Referring now to FIG. 3, details of completion counters and control 40 in accordance with an embodiment of the present invention are shown. Commit signals Commit [0:3] from WBs 32A-32D in each pipeline are provided to a look-up table 42, which is generally implemented as combinational logic. A thread ID value ThreadID[0:3] for each of the pipelines is also presented to look-up table 42. The output of look-up table is a set of numbers, one for each thread, that indicate the number of commit signals for each thread in the present cycle. A set of adders 44A-44D, one for each thread, adds the per-cycle commit number for each thread with the value from a corresponding one of registers 46A-46D. Adders 44A-44D and registers 46A-46D implement counters/accumulators that contain numbers indicating the number of completions for each thread in a given period determined by an Update signal that clocks the counts into resource control logic 48 and clears registers 46A-46D to prevent overflow, and to prevent resource starvation for low priority threads. The Update signal controls the granularity of the thread instruction scheduling/priority control scheme. Registers 46A-46D and adders 44A-44D should be wide enough to avoid overflow during the period between repetitions of the Update signal. Resource control logic uses the values of the counts received from registers 46A-46D either directly, or to compute relative thread completion rates and uses the direct or computed values to control thread priority, decode/fetch rates or other values that determine the relative number of processor pipeline resources allocated among the threads. Relative values include differences between thread completion counts and total completions, ratios of thread completion counts to total completion counts, or other metrics that permit comparison of completion counts for one thread to one or more other threads.

Figure 4:
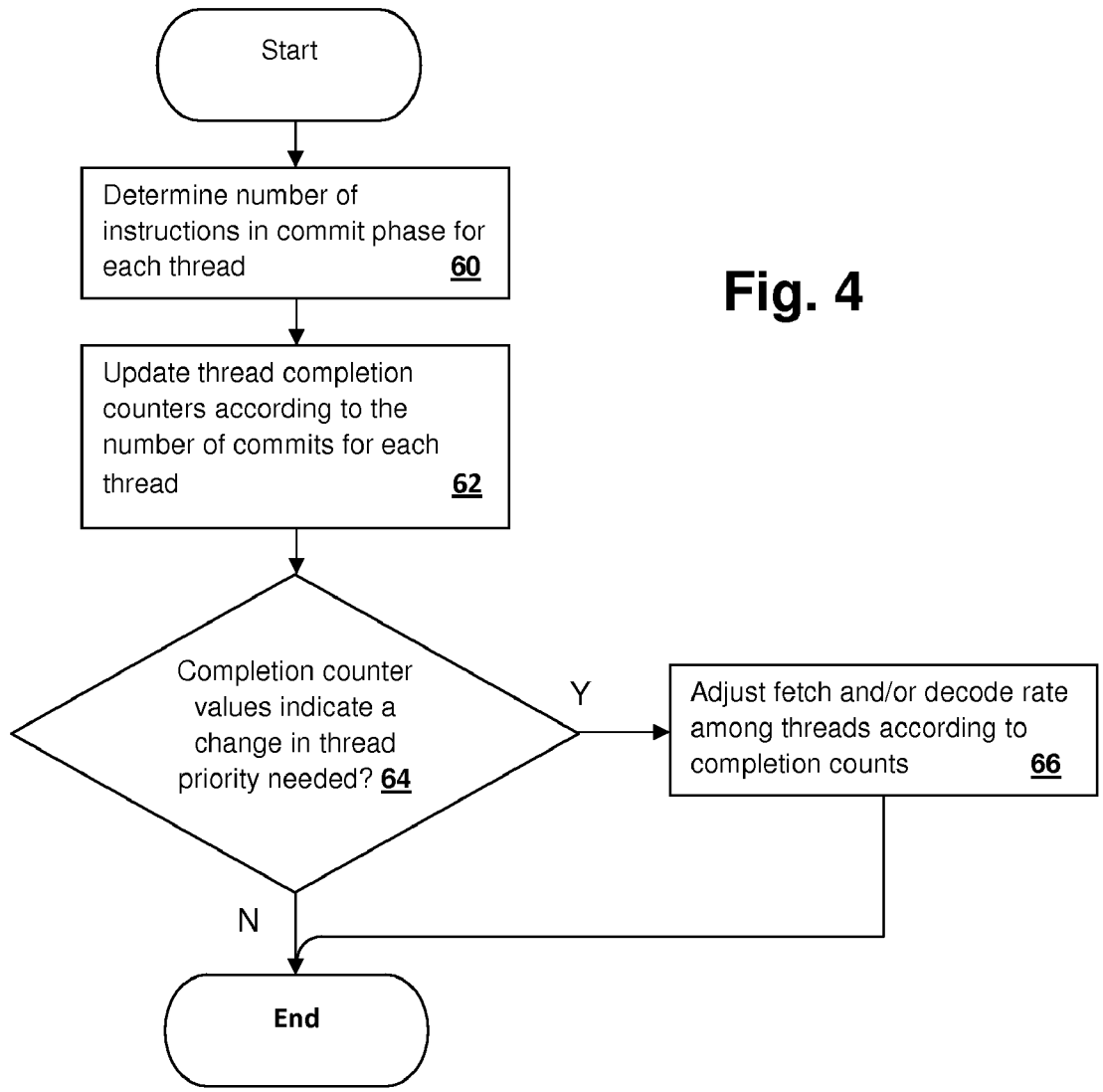
FIG. 4 is a flow chart depicting a method of controlling pipeline resources allocated among threads in accordance with an embodiment of the present invention.

Referring now to FIG. 4, a flowchart depicting a method in accordance with an embodiment of the present invention is shown. The number of instructions in a commit phase is determined for each of a number of threads (step 60). The thread completion counters/accumulators are updated for each thread according to the number of commits for the corresponding thread (step 62). If the completion counter values indicate a change in thread priority is needed (step 64), e.g., in a "fairness" scheme if a thread is completing too many or too few instructions or in a "maximize throughput" scheme if a thread is executing substantially less efficiently than another thread, then the instruction fetch and/or decode rate among the threads is adjusted according to the completion counts (step 66).

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method of controlling allocation of instruction processing resources among multiple threads executing in a multi-threaded processor, the method comprising:

fetching instructions for the multiple threads from a storage;

decoding the instructions for the multiple threads to produce decoded instructions;

issuing the decoded instructions to execution pipelines;

counting completions of instructions by execution units in the pipelines for the multiple threads to obtain corresponding counts of instruction completions for each corresponding thread, wherein each completion of an instruction by each thread increments a corresponding one of the counts, values of the counts track to the number of instruction completions accomplished by the corresponding threads; and controlling the allocation of the processing resources among the multiple threads in conformity with the values of the counts by allocating the processing resources in proportion to the values of the counts, wherein the controlling directly controls rates of instruction pre-fetching or instruction decoding for the individual ones of the multiple threads in conformity with the number of completions accomplished by the multiple threads.

2. The method of claim 1, wherein the indication of completion is a commit phase of processing that signals write-back of results from the execution pipelines, and wherein the counting counts occurrences of the commit phase for the multiple threads in corresponding counters.

3. The method of claim 1, wherein the controlling allocation of the processing resources comprises controlling a rate of the decoding individually for the multiple threads, whereby relative rates of the decoding among the multiple threads are controlled in conformity with a result of the counting.

4. The method of claim 1, wherein the controlling allocation of the processing resources comprises controlling a rate of the fetching individually for the multiple threads, whereby relative rates of the fetching among the multiple threads are controlled in conformity with a result of the counting.

5. The method of claim 1, further comprising computing relative completion rates for the multiple threads in conformity with a result of the counting, and wherein the controlling controls the allocation of the processing resources in conformity with the relative completion rates.

6. The method of claim 1, wherein the controlling operates to attempt to conform the completion rates of the multiple threads to a priority scheme for the multiple threads.

7. The method of claim 1, wherein the controlling operates to allocate more processing resources to efficiently computing threads by allocating more processing resources to a first thread having a higher completion rate than a second thread and allocating less processing resources to the second thread.

8. The method of claim 1, wherein the processor includes thread priority registers for the multiple threads and wherein the controlling adjusts the thread priority registers in conformity with and in proportion to a result of the counting.

9. A processor core supporting simultaneous execution of multiple threads, comprising:

an instruction fetch unit for fetching instructions for the multiple threads from a storage;

an instruction decode unit for decoding the instructions for the multiple threads to produce decoded instructions;

an issue unit for issuing the decoded instructions to execution pipelines of the processor;

a plurality of counters corresponding to the multiple threads for counting occurrences of completions of instructions by execution units in the pipelines for their corresponding threads, wherein each completion of an instruction by each thread increments a corresponding one of the plurality of counters, wherein values contained in the counters track to the number of instruction completions accomplished by the corresponding threads; and control logic for controlling the allocation of the processing resources among the multiple threads in conformity with the values contained in the counters by allocating the processing resources in proportion to the values contained in the plurality of counters, wherein the control logic directly controls rates of instruction pre-fetching or instruction decoding for the individual ones of the multiple threads in conformity with the number of completions accomplished by the multiple threads.

10. The processor core of claim 9, wherein the indication of completion is a commit phase of processing that signals write-back of results from the execution pipelines, and wherein the plurality of counters count occurrences of the commit phase for their corresponding threads.

11. The processor core of claim 9, wherein the control logic controls a rate of the decoding individually for the multiple threads, whereby relative rates of instruction decoding are controlled in conformity with values of the counters.

12. The processor core of claim 9, wherein the controlling allocation of the processing resources comprises controlling a rate of the fetching individually for the multiple threads, whereby relative rates of instruction fetching among the multiple threads are controlled in conformity with values of the counters.

13. The processor core of claim 9, wherein the control logic further computes relative completion rates for the multiple threads in conformity with values of the counters, and wherein the control logic controls the allocation of the processing resources in conformity with the relative completion rates.

14. The processor core of claim 9, wherein the control logic operates to attempt to conform the completion rates of the multiple threads to a priority scheme for the multiple threads.

15. The processor core of claim 9, wherein the control logic operates to allocate more processing resources to efficiently computing threads by allocating more processing resources to a first thread having a higher completion rate than a second thread and allocating less processing resources to the second thread.

16. The processor core of claim 9, wherein the processor core includes thread priority registers corresponding to the multiple threads, and wherein the control logic adjusts the thread priority registers in conformity with and in proportion to values of the counters.

17. A processing system, comprising:

a memory for storing program instructions and data;

a processor for executing the program instructions as multiple threads simultaneously executed in execution pipelines, wherein the processor comprises an instruction fetch unit for fetching instructions for the multiple threads from a storage, an instruction decode unit for decoding the instructions for the multiple threads to produce decoded instructions, an issue unit for issuing the decoded instructions to execution pipelines of the processor, a plurality of counters corresponding to the multiple threads for counting completions of instructions by execution units in the pipelines for their corresponding threads, wherein each completion of an instruction by each thread increments a corresponding one of the plurality of counters, wherein values contained in the counters track to the number of instruction completions accomplished by the corresponding threads, and control logic for controlling the allocation of the processing resources among the multiple threads in conformity with the values contained in the counters by allocating the processing resources in proportion to the values contained in the plurality of counters, wherein the control logic directly controls rates of instruction pre-fetching or instruction decoding for the individual ones of the multiple threads in conformity with the number of completions accomplished by the multiple threads.

18. The processing system of claim 17, wherein the indication of completion is a commit phase of processing that signals write-back of results from the execution pipelines, and wherein the plurality of counters count occurrences of the commit phase for their corresponding threads.

19. The processing system of claim 17, wherein the control logic controls a rate of the decoding individually for the multiple threads, whereby relative rates of instruction decoding are controlled in conformity with values of the counters.

20. The processing system of claim 17, wherein the control logic further computes relative completion rates for the multiple threads in conformity with values of the counters, and wherein the control logic controls the allocation of the processing resources in conformity with the relative completion rates.

* * * * *